(12) United States Patent
Ionkin et al.

(10) Patent No.: US 8,480,944 B2
(45) Date of Patent: Jul. 9, 2013

(54) QUATERNARY CHALCOGENIDE WAFERS

(75) Inventors: Alex Sergey Ionkin, Kennett Square, PA (US); Brian M. Fish, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 207 days.

(21) Appl. No.: 12/963,989

(22) Filed: Dec. 9, 2010

(65) Prior Publication Data

US 2012/0146189 A1 Jun. 14, 2012

(51) Int. Cl.
*C04B 35/547* (2006.01)
*C04B 35/626* (2006.01)

(52) U.S. Cl.
USPC .......................... 264/319; 264/334; 264/335

(58) Field of Classification Search
USPC ....................................................... 264/319
See application file for complete search history.

(56) References Cited

U.S. PATENT DOCUMENTS

| | | | |
|---|---|---|---|
| 6,488,770 B1 | 12/2002 | Meissner et al. | |
| 2002/0025675 A1* | 2/2002 | Chu et al. | 438/653 |
| 2010/0041807 A1* | 2/2010 | Eiha et al. | 524/401 |

FOREIGN PATENT DOCUMENTS

| | | | |
|---|---|---|---|
| CN | 101026198 A | | 8/2007 |
| DE | 1927629 A | * | 2/1970 |
| JP | 63076413 A | | 4/1988 |
| JP | 02194519 A | | 8/1990 |
| JP | 05229812 A | * | 9/1993 |
| WO | 2010006623 A2 | | 1/2010 |

OTHER PUBLICATIONS

English abstract of JP05229812.*
English abstract of DE1927629.*
Mellikov, E. et al., Monograin materials for solar cells, Solar Energy Materials & Solar Cells, 2009, pp. 65-68, vol. 93, Elsevier B.V.
Krustok, J. et al., Temperature dependence of $Cu_2ZnSn(Se_xS_{1-x})4$ monograin solar cells, Solar Energy, 2010, pp. 379-383, vol. 84, Elsevier Ltd.
Mellikov, E. et al., Powder materials and technologies for solar cells, International Journal of Materials and Product Technology, 2007, pp. 291-311, vol. 28, Nos. 3/4, Inderscience Enterprises Ltd.
Altosaar, M. et al., Monograin Powders and Layers for Photovoltaic Application, Materials Research Society Symposium Proceedings, 1996, pp. 563-568, vol. 426, Materials Research Society.

* cited by examiner

*Primary Examiner* — Larry Thrower
*Assistant Examiner* — Xue Liu

(57) ABSTRACT

Disclosed herein are processes for making quaternary chalcogenide wafers. The process comprises milling quaternary chalcogenide crystals to form milled particles, and then compressing the milled particles to form a quaternary chalcogenide wafer. The quaternary chalcogenide wafers are useful for forming solar cells.

7 Claims, No Drawings

QUATERNARY CHALCOGENIDE WAFERS

FIELD OF THE INVENTION

The present invention relates to quaternary chalcogenide wafers and processes for their preparation.

TECHNICAL BACKGROUND

Currently, most electric power-generating solar cells have silicon as as a light-absorbing, semiconducting material and are fabricated using relatively expensive production processes. To make solar cells economically viable, thin-film solar cells have been developed, which are based on thin-film, light-absorbing semiconductor materials, such as copper-indium-gallium-sulfo-di-selenide, $Cu(In,Ga)(S,Se)_2$, also termed CIGS. CIGS-based solar cells have demonstrated power conversion efficiencies exceeding 19%.

Despite the demonstrated potential of CIGS in thin-film solar cells, the toxicity and low abundance of indium and selenium are major impediments to the widespread use and acceptance of CIGS in commercial devices. An attractive alternative for absorber layers of thin-film solar cells is quaternary chalcogenides, particularly copper-zinc-tin-sulfide, $Cu_2ZnSnS_4$ (CZTS). CZTS has a direct bandgap of about 1.5 eV and an absorption coefficient greater than $10^4$ cm$^{-1}$. In addition, CZTS does not include any toxic or low abundance elements.

Thin films of CZTS have been prepared via sputtering of Cu, SnS, and ZnS precursors; hybrid sputtering; pulsed laser deposition; spray pyrolysis of halides and thiourea complexes; and thermal sulfurization of electrodeposited, e-beam deposited, or sol-gel deposited Cu—Zn—Sn precursors.

Bulk quantities of CZTS have been prepared in evacuated quartz ampoules at temperatures between 400° C. to 1150° C. Bulk quantities have also been prepared in a furnace with a source of sulfur, such as $H_2S$.

However, processes for providing CZTS and its chalcogenide analogs in wafer form have not been disclosed.

Hence, there is a need for a safe, robust process to produce CZTS and its chalcogenide analogs in wafer form for non-vacuum based thin-film solar cells.

SUMMARY

Disclosed is a process for making a quaternary chalcogenide wafer comprising:

(a) milling quaternary chalcogenide crystals to form milled particles with a particle size, $d_{90}$, in the range of 0.5 microns to 10 microns; and (b) compressing the milled particles to form a quaternary chalcogenide wafer.

DETAILED DESCRIPTION

Disclosed is a process for making a quaternary chalcogenide wafer comprising milling quaternary chalcogenide crystals, and then compressing the milled particles at a suitable pressure and at a suitable temperature to form a quaternary chalcogenide wafer.

In an embodiment, the quaternary chalcogenide crystals comprise $Cu_2ZnSnS_4$ (CZTS), $Cu_2ZnSn(S_a,Se_{1-a})_4$, where $0 \leq a \leq 1$ (CZTS/Se), or $Cu_2ZnSnSe_4$ (CZTSe). CZTS and its analogs (CZTSe and CZTS/Se) may also be doped by small amounts of other elements, such as alkali and alkali earth metals, wherein the dopants are typically derived from the chalcogen source.

Any suitable method can be used to make the quaternary chalcogenide crystals. For example, the quaternary chalcogenide crystals can be prepared by heating a reaction mixture comprising: a source of copper, e.g., copper sulfide; a source of zinc, e.g., zinc sulfide; a source of tin, e.g., tin(II) sulfide; a source of chalcogen (sulfur and/or selenium), e.g., metal sulfides such as copper sulfide, zinc sulfide, and tin(II)sulfide and/or metal selenides; and a flux, e.g., cesium chloride, in an inert atmosphere, such as under nitrogen flow at 750° C. for 24 hours. The molar ratio of copper:zinc:tin:chalcogen in the reaction mixture is 2:1:1:(4 or greater). The ratios of the copper, zinc, and tin can deviate from these integer values by up to 20 mole %. The quaternary chalcogenide crystals are isolated by first cooling the reaction mixture to ambient temperature in the flow of an inert gas, e.g., nitrogen, argon, helium or a mixture of thereof. After cooling, the flux is removed from the reaction mixture by washing with a flux solvent, e.g., water, leaving the undissolved crystals of quaternary chalcogenide. The quaternary chalcogenide crystals can be dried, such as at 1-mm vacuum at room temperature for 12 h or at elevated temperature up to 200° C.

The process for making a quaternary chalcogenide wafer comprises milling the quaternary chalcogenide crystals to form milled particles. Suitable milling techniques include ball milling, vibratory milling, Eiger milling, bead milling, jet milling, disc milling, and ultrasonic milling. In an embodiment, the quaternary chalcogenide crystals are milled under nitrogen using yttria-stabilized zirconia (YSZ) or tungsten carbide beads as the milling media, and isopropanol (IPA) on a jar mill at 60 rpm to 100 rpm for 1 to 7 days. The milled particles are separated from the milling media and milling fluid and dried in vacuum at a temperature in the range of room temperature to 50° C. for 5 hours to 5 days, or 1 day to 3 days. The particle size of the milled particles can be measured using any suitable technique, such as, laser light scattering. In an embodiment, the milled particles have a particle size, $d_{90}$ in the range of 0.1 micron to 10 microns, or 0.5 microns to 5 microns, or 0.8 microns to 2.5 microns. The milled particles can optionally be sieved through a suitable screen, e.g., a 325 mesh screen.

As used herein, the particle sizes refer to cumulative particle size distributions based on volume and assuming spherical particles. Hence, the particle size $d_{90}$ is the particle size, such that 90% of the total volume of the sample of particles comprises particles having volume smaller than the volume of a sphere having a diameter of $d_{90}$.

The process for making a quaternary chalcogenide wafer also comprises compressing the milled particles at a suitable pressure and at a suitable temperature to form a quaternary chalcogenide wafer. Any suitable device and/or method can be used to compress the milled particles. For example, the milled particles can be pressed using a die assembly and a press, such as, Model # P-215C (PHI, City of Industry, Calif.). Suitable pressures for compressing the milled particles range from 15 MPa to 463 MPa, or 30 MPa to 250 MPa, or 90 MPa to 120 MPa. The milled particles can be compressed at a temperature in the range of room temperature to 250° C., or 30° C. to 90° C., or 50° C. to 75° C. for a period of time in the range of about 5 minutes to 3 days, or 20 minutes to 2 days, or 45 minutes to 1 day to form a quaternary chalcogenide wafer. In an embodiment, the particles are compressed under nitrogen.

In another embodiment, the milled particles are mixed with a binder before the step of compressing the milled particles. Suitable binder include sulfur, corn starch, cesium chloride, and mixtures thereof.

The as-prepared quaternary chalcogenide wafer has a thickness in the range of 10 microns to 300 microns, or 10 microns to 150 microns, or microns to 45 microns.

In one embodiment, the process for making a quaternary chalcogenide wafer also comprises sintering the quaternary chalcogenide wafer. Sintering is performed, for example, for a period of about 5 minutes to about 2.5 hours, or 15 minutes to 1 hour, or 20 minutes to 45 minutes at a temperature in the range of 100° C. to 950° C., or 150° C. to 450° C., or 200° C. to 550° C. In some embodiments, sintering is done under nitrogen.

The quaternary chalcogenide wafers comprising CZTS or its analogs (CZTSe and CZTS/Se) prepared by the process described above can be used in a broad range of semiconductor devices, although they are especially effective in light-receiving elements such as photodiodes and solar cells.

As used herein, the phrase "solar cell" is used interchangeably with "photovoltaic cell".

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

As used herein, the phrase "one or more" is intended to cover a non-exclusive inclusion. For example, one or more of A, B, and C implies any one of the following: A alone, B alone, C alone, a combination of A and B, a combination of B and C, a combination of A and C, or a combination of A, B, and C.

Also, use of "a" or "an" are employed to describe elements and described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

In the foregoing specification, the concepts have been disclosed with reference to specific embodiments. However, one of ordinary skill in the art appreciates that various modifications and changes can be made without departing from the scope of the invention as set forth in the claims below.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all embodiments.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

The concepts disclosed herein will be further described in the following examples, which do not limit the scope of the invention described in the claims.

The examples cited here relate to quaternary chalcogenide wafers used as absorber layer for solar cells. The discussion below describes how a chalcogenide wafer is formed.

EXAMPLES

Synthesis of $Cu_2ZnSnS_4$ (CZTS) Crystals

Copper(II) sulfide (8.71 g, 0.091 mol), zinc(II) sulfide (4.44 g, 0.0456 mol), tin(II) sulfide (6.88 g, 0.0456 mol), all purchased from Alfa Aesar and cesium chloride (CsCl) (50.0 g) purchased from (BDH, Molecular Biology Grade) was obtained from VWR International (West Chester, Pa.) were mixed together by shaking individual components for 15 min in a dry box to form a mixture. The mixture was placed in a 50 mL alumina boat, and heated in a tube furnace with nitrogen flow at 750° C. for 24 h. The furnace was cooled to room temperature and then the boat was removed and immersed in 500 mL of distilled water. Black crystalline material was filtered off, washed with an additional 500 mL of water, and dried at 1 mm vacuum for 12 h. The CZTS structure was confirmed by single X-ray analysis. The purity of CZTS crystals was evaluated by X-ray powder diffraction using Rietveld refinement and was found to be in the range of 95-99%.

Preparation of Milled CZTS Particles

CZTS ($Cu_2ZnSnS_4$) crystals (10-20 g) prepared supra were milled using yttria-stabilized zirconia (YSZ) (200-230 g) (Quakenbush Company Inc., Crystal Lake, Ill.) or tungsten carbide beads (600 g) (Glen Mills Inc., Clifton, N.J.), both of 5 mm diameter as the milling media, and isopropanol (IPA) (40-50 g) on a jar mill (US Stoneware, East Palestine, Ohio) at 80 rpm for 1 to 7 days. The CZTS crystals were milled until the $d_{90}$ of the milled CZTS particles was in the range of 0.1 micron to 10 microns. The particle size of the milled CZTS particles was measured using a laser diffraction particle size analyzer, Horiba LA-910 (Horiba Instruments Inc., Ann Arbor, Mich.). The milled CZTS particles were separated from the isopropanol using a centrifuge (Damon-IEC DPR-6000, Thermo Fisher, Waltham, Mass.) at 3000 rpm for 30 min, and dried in vacuum at 50° C. for 3 days. After drying, the milled CZTS particles were sieved through a 325 mesh screen sieve to yield CZTS particles having particle sizes in the range of 0.1 to 10 microns. Table 1 summarizes the milling media used, amounts thereof, milling time, and particle size after milling for eight different batches of milled particles.

TABLE 1

Preparation of milled particles

| Milled Sample # | $Cu_2ZnSnS_4$ (CZTS) (g) | Ytrrium-stabilized Zirconia (YSZ) (g) | Tungsten carbide (WC) (g) | Isopropanol (g) | Milling time (days) | Particle size after milling, $d_{90}$ (microns) |
|---|---|---|---|---|---|---|
| A | 17.13 | 230 | — | 43.3 | 2 | 2.290 |
| B | 18.77 | 230 | — | 45.0 | 2 | 1.181 |

TABLE 1-continued

Preparation of milled particles

| Milled Sample # | $Cu_2ZnSnS_4$ (CZTS) (g) | Ytrrium-stabilized Zirconia (YSZ) (g) | Tungsten carbide (WC) (g) | Isopropanol (g) | Milling time (days) | Particle size after milling, $d_{90}$ (microns) |
|---|---|---|---|---|---|---|
| C | 17.55 | 233 | — | 42.0 | 2 | 2.207 |
| D | 19.16 | — | 600 | 44.0 | 2 | 1.052 |
| E | 17.16 | — | 601 | 44.0 | 2 | 0.997 |
| F | 17.92 | — | 607 | 44.0 | 2 | 1.241 |
| G | 17.8 | — | 600 | 40.0 | 3 | 1.661 |
| H | 19.47 | — | 601 | 40.0 | 3 | 1.177 |

Preparation of CZTS Wafers

Two dies were used to form CZTS wafers. A small die produced wafers having a diameter of 1.27 cm (0.5 inches), and a large die produced wafers having a diameter of 3.175 cm (1.25 inches).

Binders such as sulfur, corn starch, and cesium chloride were mixed with the milled CZST particles before being added to the die. Table 2 summarizes the amount of CZTS and binder used, die size, and load applied and pressing time for 10 different batches of wafers formed.

The milled CZST particles (0.189-1.890 g), as prepared supra, and in some instances, binder, were loaded into one of the two dies, followed by placing a die pellet on top of the milled CZST particles and placing a dowel pin into the die pellet. The die assembly including the die, milled CZST particles, the die pellet, and the dowel pin was then loaded between the two platens of a press, Model # P-215C (PHI, City of Industry, Calif.) and the pressure was applied until a pressure of 115.8 MPa (7.5 tons/in$^2$) for the smaller die and pressure of 193-247 MPa (12.5-16 tons/in$^2$) for the larger die was attained. The samples were left at this pressure for 5-30 min before the pressure was released and the wafer was removed from the die assembly. The wafers had a thickness in the range of 150-300 microns. The amount of CZTS used and the pressure applied depended upon the size of the die used to press the wafers. For example, less than 300 mg of milled CZST particles were used to make a half-inch wafer with applied pressure of less than 120 MPa, whereas more than 1 g of milled CZST particles were used to make the 1.25-inch wafer with an applied pressure of at least 150 MPa.

TABLE 2

Compressing milled CZTS particles to form CZTS wafers

| Example # | Milled Sample # | Milled $Cu_2ZnSnS_4$ particles (CZTS) (g) | Binder | Binder amount (g) | Die size (cm) | Pressure applied (MPa) | Pressing time (minutes) |
|---|---|---|---|---|---|---|---|
| 1 | E | 0.189 | — | — | 1.27 | 115.8 | 30 |
| 2 | B | 0.270 | — | — | 1.27 | 115.8 | 30 |
| 3 | G | 0.260 | — | — | 1.27 | 115.8 | 30 |
| 4 | D | 1.218 | — | — | 3.175 | 193.1 | 30 |
| 5 | H | 1.362 | — | — | 3.175 | 193.1 | 5 |
| 6 | F | 2.069 | — | — | 3.175 | 247.1 | 30 |
| 7 | A | 1.015 | Sulfur | 0.312 | 3.175 | 193.1 | 30 |
| 8 | A | 1.012 | Corn starch | 0.254 | 3.175 | 193.1 | 30 |
| 9 | C | 1.789 | CsCl | 0.578 | 3.175 | 154.4 | 30 |
| 10 | C | 1.890 | CsCl | 0.777 | 3.175 | 154.4 | 45 |

Sintering of CZTS Wafers

A wafer from Example #7 prepared supra, and described in Table 2 was placed on a 2.54-cm (1-inch) square alumina tray. The aluminum tray with the wafer was heated in a quartz tube furnace (having a diameter of 6.35 cm) with nitrogen flow at 750° C. for 1 h. The wafer in the tube furnace was cooled to room temperature under nitrogen. A similar procedure was used to sinter Example #8 and Example #10, except that Example #10 was heated for 2.5 h.

What is claimed is:

1. A non-vacuum based process for making a quaternary chalcogenide wafer comprising:
   a. milling quaternary chalcogenide crystals to form milled particles with a particle size, d90 in the range of 0.1 micron to 10 microns, wherein the quaternary chalcogenide crystals are selected from the group consisting of $Cu_2ZnSnS_4$ (CZTS); $Cu_2ZnSn(S_a,Se_{1-a})_4$, where $0 \leq a \leq 1$ (CZTS/Se); and $Cu_2ZnSnSe_4$ (CZTSe);
   b. compressing the milled particles at a temperature in the range of room temperature to 250° C. to form a quaternary chalcogenide wafer having a thickness in the range of 10 microns to 300 microns.

2. The process of claim 1, wherein the particle size, $d_{90}$ of the milled particles is in the range of about 0.8 microns to about 2.5 microns.

3. The process of claim 1, wherein the step of compressing the milled particles comprises compressing the milled particles at a pressure in the range of 15 MPa to 463 MPa.

4. The process of claim 1, wherein the step of compressing the milled particles comprises compressing the milled particles under nitrogen.

5. The process of claim 1, further comprising mixing the milled particles with a binder before the step of compressing the milled particles.

6. The process of claim 5, wherein the binder comprises sulfur, corn starch, cesium chloride, or mixtures thereof.

7. The process of claim 1, further comprising sintering the quaternary chalcogenide wafer at a temperature in the range of about 100° C. to about 950° C. for a period of about 5 minutes to 2.5 hours.

* * * * *